US009033269B2

(12) United States Patent
Kobos et al.

(10) Patent No.: US 9,033,269 B2
(45) Date of Patent: May 19, 2015

(54) LINEAR PATH FOOD PROCESSOR

(71) Applicant: Whirlpool Corporation, Benton Harbor, MI (US)

(72) Inventors: Duane M. Kobos, Laporte, IN (US); Jeremy T. Wolters, Stevensville, MI (US); Anthony S. Roberts, Granger, IN (US); Michael P. Conti, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 13/783,204

(22) Filed: Mar. 1, 2013

(65) Prior Publication Data

US 2014/0246529 A1    Sep. 4, 2014

(51) Int. Cl.
*A47J 43/07* (2006.01)
*A47J 43/046* (2006.01)

(52) U.S. Cl.
CPC .............. *A47J 43/07* (2013.01); *A47J 43/0722* (2013.01); *A47J 43/0716* (2013.01); *A47J 43/046* (2013.01)

(58) Field of Classification Search
CPC .......................... A47J 43/0716; A47J 43/0722
USPC ............ 241/92, 282.1, 282.2, 278.1, DIG. 17
See application file for complete search history.

(56) References Cited

U.S. PATENT DOCUMENTS

| | | | | |
|---|---|---|---|---|
| D126,992 S | * | 5/1941 | Schuhmann | D7/373 |
| 2,588,906 A | * | 3/1952 | Clark | 100/98 R |
| 4,510,853 A | * | 4/1985 | Takagi | 99/286 |
| 5,381,969 A | * | 1/1995 | Paulig | 241/36 |
| D413,226 S | * | 8/1999 | Barker | D7/379 |
| D431,973 S | * | 10/2000 | O'Flynn et al. | D7/665 |
| D464,236 S | * | 10/2002 | Li | D7/666 |
| D464,535 S | * | 10/2002 | O'Flynn et al. | D7/666 |
| 8,250,959 B2 | | 8/2012 | Beber et al. | |
| 2006/0060091 A1 | | 3/2006 | Chang | |
| 2006/0191425 A1 | | 8/2006 | Chang | |
| 2011/0139017 A1 | | 6/2011 | Beber et al. | |
| 2011/0265664 A1 | | 11/2011 | Goncalves et al. | |
| 2011/0265665 A1 | | 11/2011 | Goncalves et al. | |
| 2011/0265666 A1 | | 11/2011 | Beber et al. | |
| 2012/0272835 A1 | | 11/2012 | Fister et al. | |
| 2013/0082130 A1 | * | 4/2013 | Hulett et al. | 241/277 |

FOREIGN PATENT DOCUMENTS

| | | |
|---|---|---|
| EP | 0177748 A2 | 4/1986 |
| EP | 2135532 A1 | 12/2009 |

(Continued)

OTHER PUBLICATIONS

European Patent Application No. 14155439.4, filed Feb. 17, 2014, Applicant: Whirlpool Corporation, European Search re: same, mail date: May 24, 2014.

*Primary Examiner* — Faye Francis

(57) ABSTRACT

A food processor of one design includes a housing including a motor and a coupling for rotating a food processing implement. The housing receives a feed chute assembly with a receiving chute for food to be processed. The feed chute assembly also includes an aligned discharge chute communicating with a processing implement, such that food is processed linearly from the receiving chute to the discharge chute. The housing has an open front for receiving containers for food processed by said food processor. This results in a smaller food processor which is capable of directly feeding processed food into a container separate from the food processor itself.

15 Claims, 8 Drawing Sheets

(56) References Cited

FOREIGN PATENT DOCUMENTS

| | | | |
|---|---|---|---|
| GB | 2470002 A | 11/2010 | |
| WO | 2005037036 A1 | 4/2005 | |
| WO | 2012113106 A1 | 8/2012 | |
| WO | 2012113107 A1 | 8/2012 | |
| WO | 2012113125 A1 | 8/2012 | |

* cited by examiner

LINEAR PATH FOOD PROCESSOR

BACKGROUND

The present application generally relates to a food processor.

Food processors, such as those employed in the home environment for food preparation such as slicing, chopping, cubing, and dicing of food items, typically have a work bowl with a cylindrical projection extending upwardly from the floor and surrounding a drive shaft to which different implements can be attached for the different processes as desired. The processed food is typically directed to the sides via an impeller or the like and then resides in the work bowl. The work bowl has a cover with a feed chute and pusher member to force the food being processed into the processing implement. With respect to such conventional food processors where food is thrown to the side outlet via an impeller, one drawback is that the food typically is redirected downwards via an angled wall. With the food being ejected at high velocity, this angled wall can tend to cause extra vibration to the machine and can also bruise or damage softer foods.

When using such a conventional food processor, it is necessary to transfer the processed food from the work bowl to whatever cooking or further food processing container is being employed with the recipe being used. Additionally, it is difficult for the user to be able to inspect processed ingredients between runs for desired thickness or size, unless the cover is removed and the processing disk is removed. The work bowl, the cover, and the processing implement, together with the drive mechanism, frequently become covered with residue which can be difficult to clean. Also, due partly to the design of the work bowl and its drive mechanism, conventional food processors are somewhat bulky and heavy. Such large food processors typically do not reside on a countertop but must be stored, occupying significant cabinet space.

Reducing the size, weight, and cost of such food processors, as well as facilitating not only their use but the cleaning of their components, would be a significant improvement to existing designs. The linear path food processor also provides the benefit of reduced machine vibration without bruising of the food.

SUMMARY

A food processor of one design includes a housing including a motor and a coupling for rotating a food processing implement. The housing receives a feed chute assembly with a receiving chute for food to be processed. The feed chute assembly also includes an axially aligned discharge chute and a processing implement, such that food is processed linearly from the receiving chute to the discharge chute. The housing has an open front for receiving containers for food processed by said food processor. This results in a smaller food processor which is capable of directly feeding processed food into a container separate from the food processor itself. Also, it is easy to inspect ingredients during or between processing runs, either into a collection bowl or onto the hand of a user. More specifically, the legs of the food processor define a concave curved space between them. The space allows for the discharge of processed food into the hand of a user for inspection of the processed ingredient.

These and other features, advantages, and objects of the design will be further understood and appreciated by those skilled in the art upon studying the following specification, claims, and appended drawings.

DETAILED DESCRIPTION OF EMBODIMENTS

For purposes of description herein the terms "upper," "lower," "right," "left," "rear," "front," "vertical," "horizontal," and derivatives thereof shall relate to the present application as oriented in FIGS. 1-4. However, it is to be understood that the application may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIGS. 1-4, there is shown a linear food processor 10 embodying the present design. The food processor has two major components, a housing 20 comprising upper and lower sections 22 and 24, respectively, and a removable feed chute assembly 30. Housing 20 is shown in the exploded view shown in FIG. 5, while the removable feed chute assembly is illustrated in the exploded view of FIG. 6. Details of both components are shown in the cross-sectional view of FIG. 7.

Figure 1:
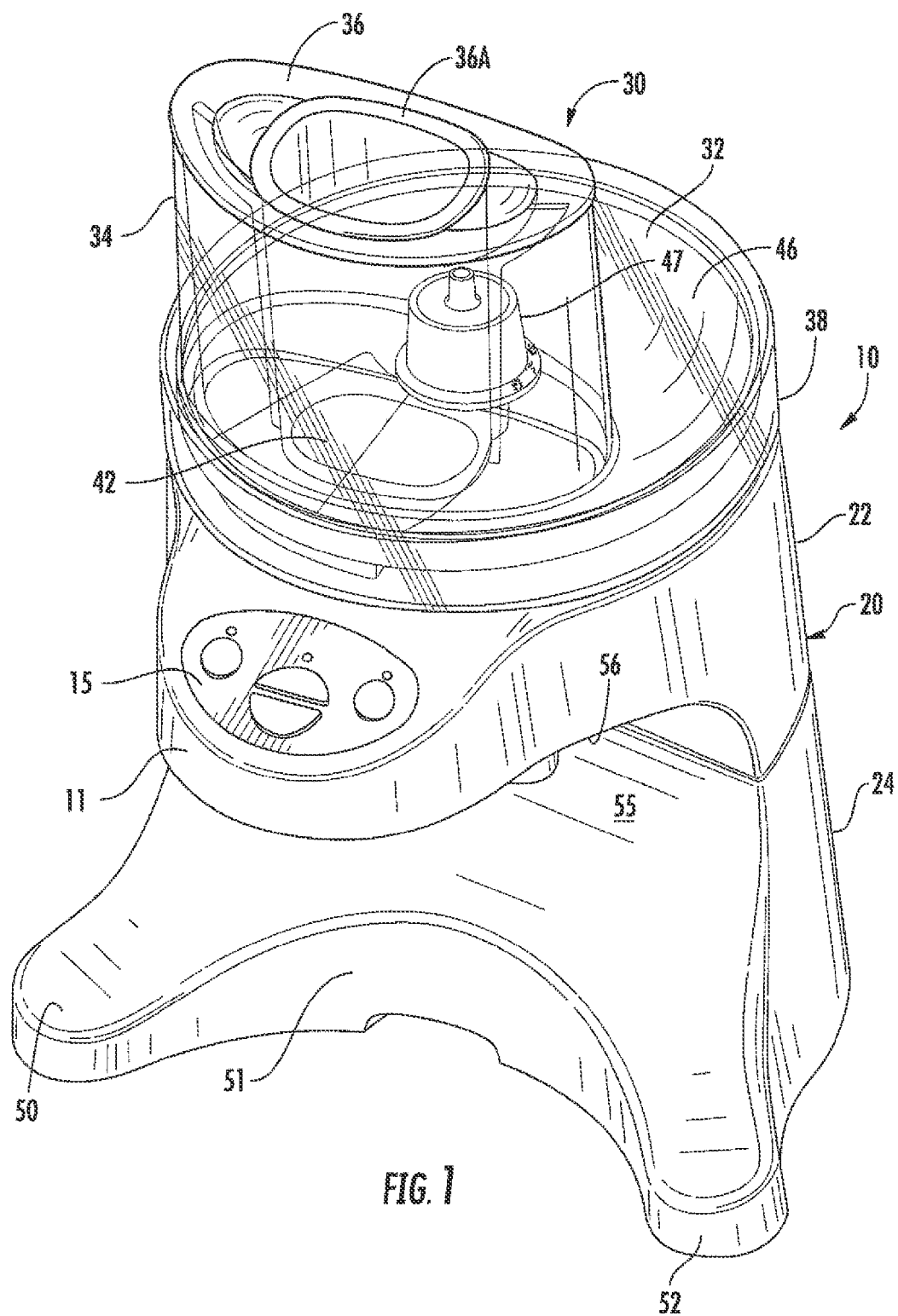
FIG. 1 is a frontal perspective view of a food processor embodying the present design.
Figure 2:
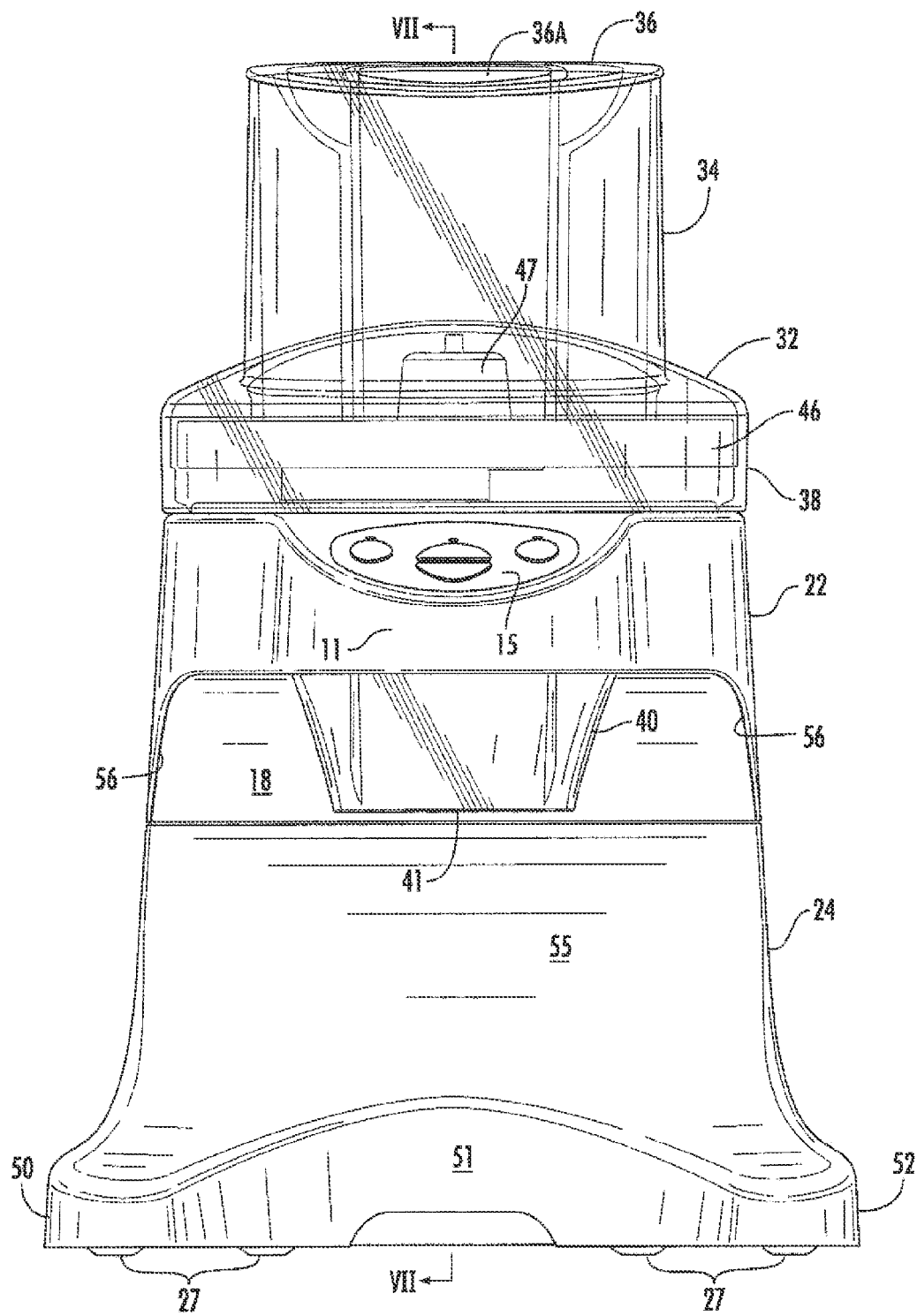
FIG. 2 is a front elevational view of the food processor shown in FIG. 1.
Figure 3:
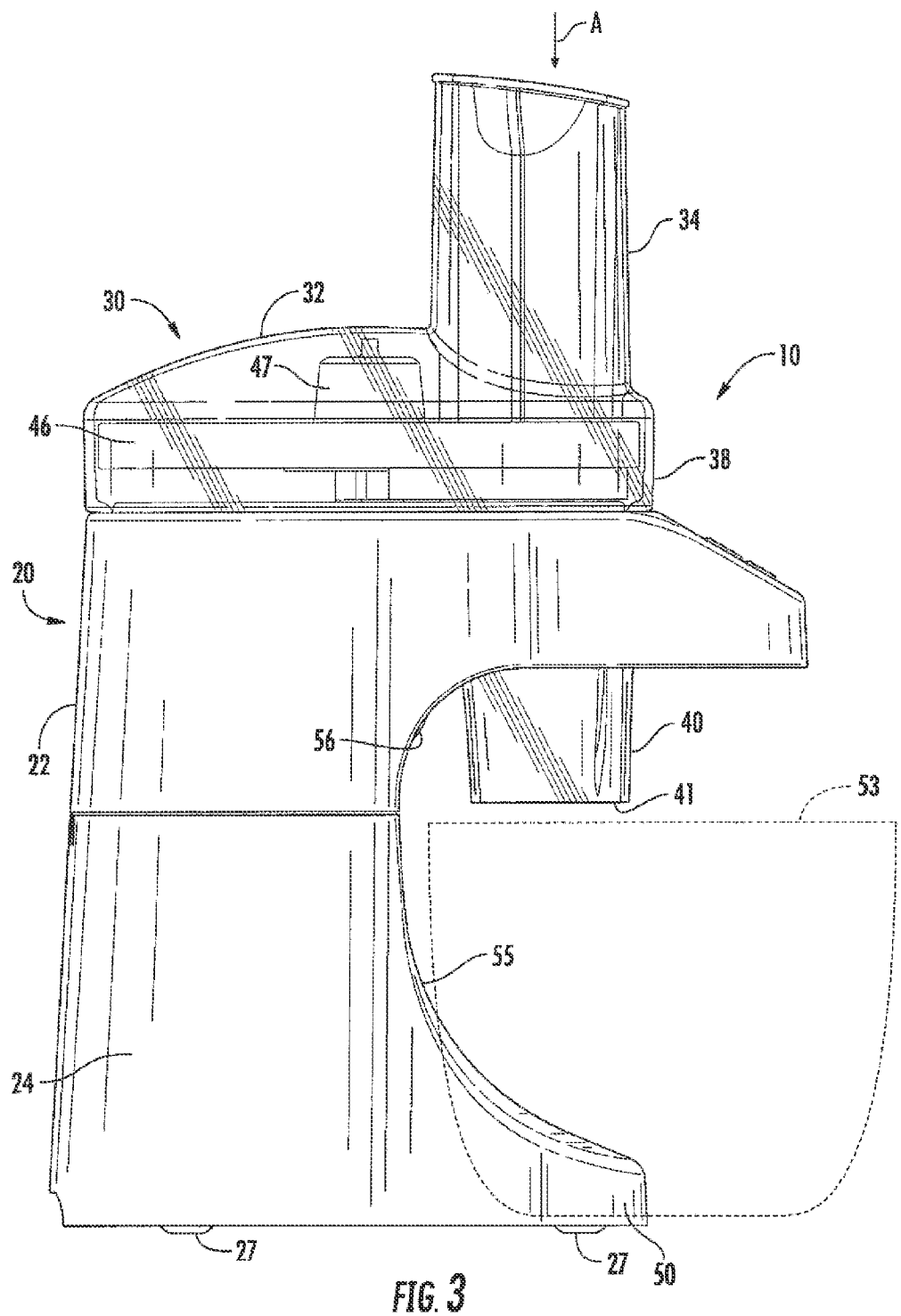
FIG. 3 is a left side elevational view of the food processor shown in FIGS. 1 and 2.
Figure 4:
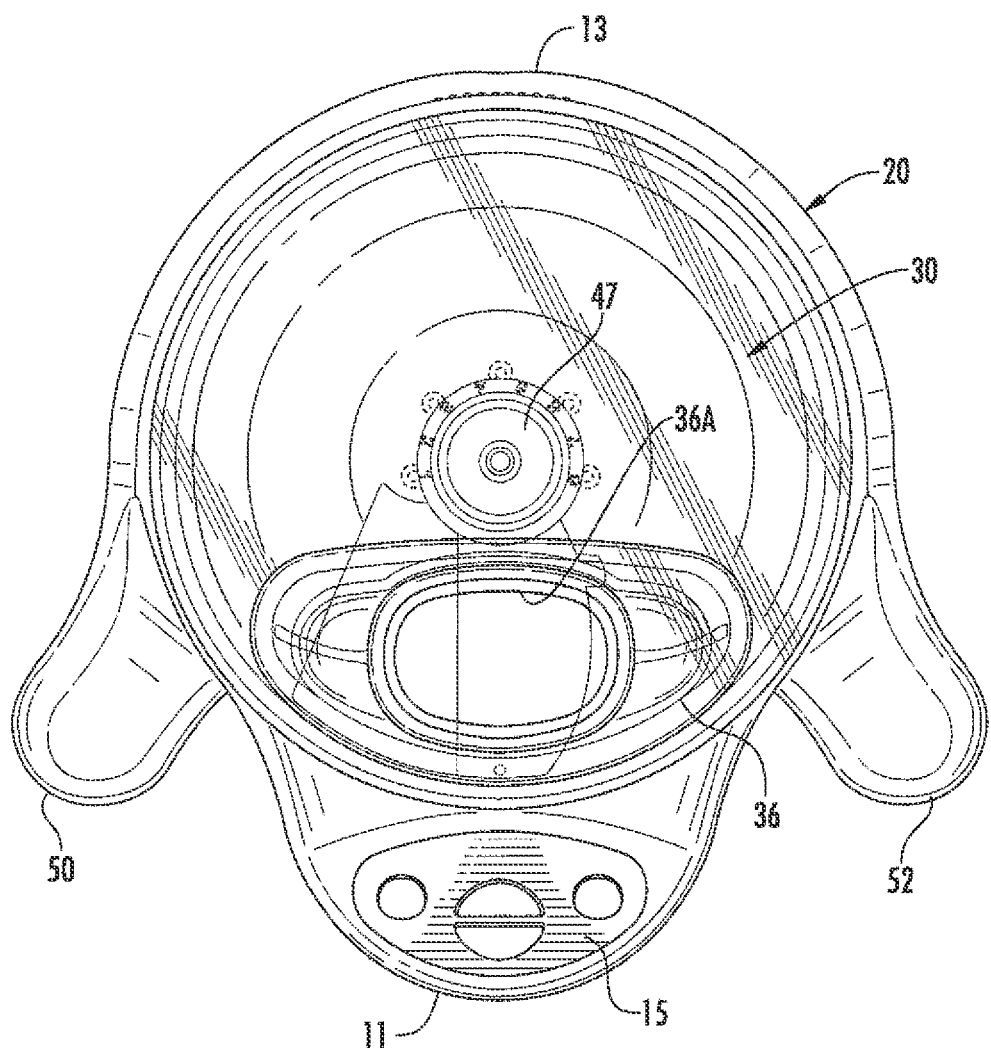
FIG. 4 is a top plan view of the food processor shown in FIGS. 1-3.

The housing 20 of the food processor includes a base plate 26 (FIG. 5) with four feet 27 for providing support for the food processor during use and storage. The base plate, together with lower housing 24, defines, as best seen in FIGS. 1-4, a pair of outwardly diverging legs 50 and 52 with a concave wall 51 therebetween for receiving, as an example, a container, such as a bowl 53 (shown in phantom form in FIG. 3). As also illustrated in FIG. 3, as well as FIG. 5, the lower housing 24 has a concavely curved wall 55, while the upper housing 22 has concave, upwardly curved edges 56 covered by bezel 18 as described below. This shape allows the entry of a container, such as bowl 53, to be positioned in an operative position, as seen in FIG. 3, for receiving processed food in a generally linear vertical path from feed chute assembly 30 through the discharge chute 40. The linear path is illustrated by the axis A shown in FIG. 7 and is a direct path from feed chute 34 to discharge chute 40 with at least one processing implement 46 (FIG. 6) interposed in the pathway. The housing 20 has a curved rear surface 13, such that the food processor 10 can be conveniently positioned in the corner of a walled countertop.

Figure 5:
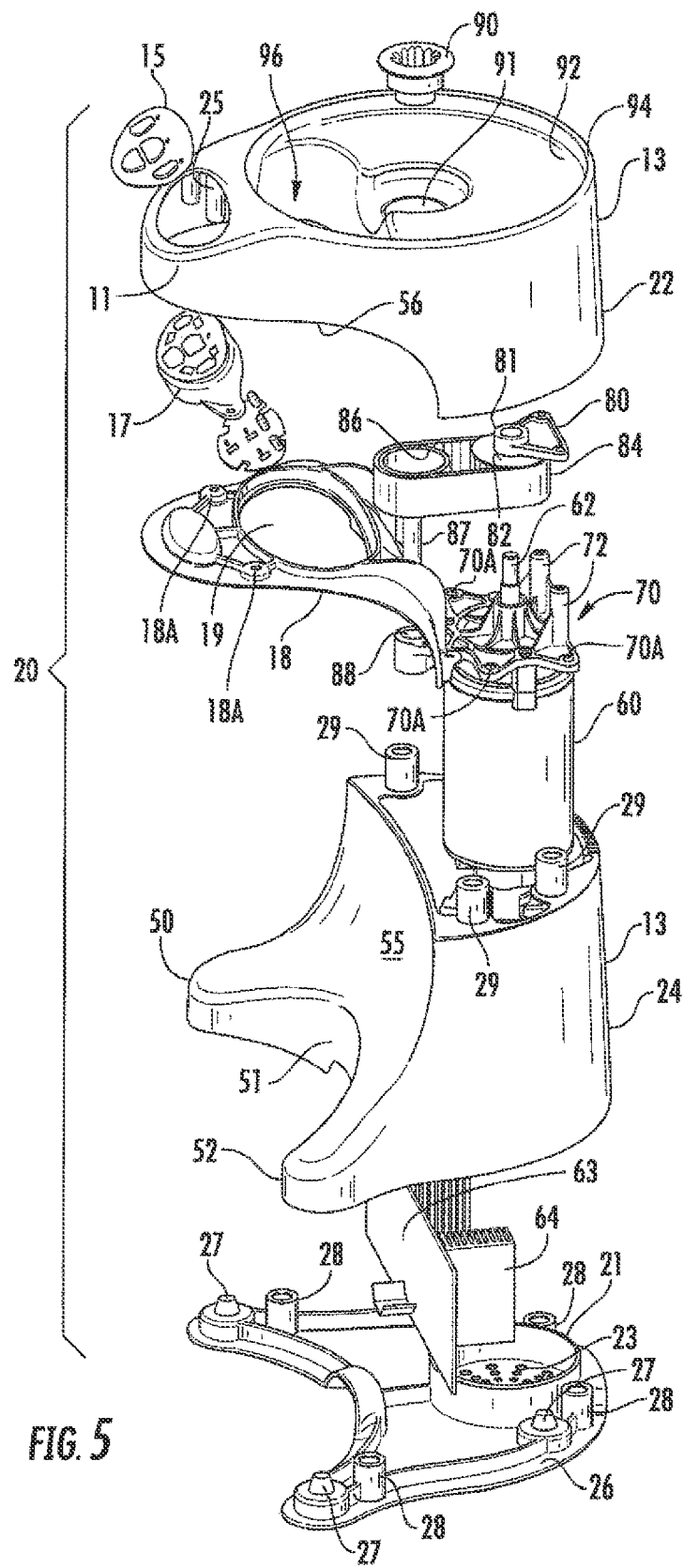
FIG. 5 is an exploded perspective view of the housing for the food processor shown in the previous figures.

The base plate 26, as illustrated in FIG. 5, includes mounting ferrules 28 for receiving fasteners, such as threaded screws, which extend upwardly through plate 26 through similar mounting ferrules 29 in the lower housing section 24, which are aligned with mounting ferrules 28. Lower housing 24 includes mounting ferrules 29 for receiving fasteners which extend upwardly through lower housing 24 through similar mounting ferrules (not shown) in upper housing 22, which are aligned with mounting ferrules 29. It being understood that there are four such threaded mounting bosses aligned with ferrules 28 and that there are four such threaded mounting bosses aligned with ferrules (not shown) to secure the upper and lower housings together with their operating mechanism for driving a food processing implement. Bezel 18 includes ferrules 18A of a similar arrangement which are aligned with mounting ferrules 25 in upper housing 22. Lower plate 26 also includes a motor fan-receiving vented cylindrical housing 21 having vents 23 through the bottom, as illustrated in FIG. 5. Printed circuit board 63 is provided for motor power control and includes heat sink 64 mounted to the printed circuit board 63 in the conventional manner. A mounting ferrule extends downwardly from lower housing 24 for receiving threaded fastener 62 for mounting printed circuit board 63 to lower housing 24.

Figure 7:
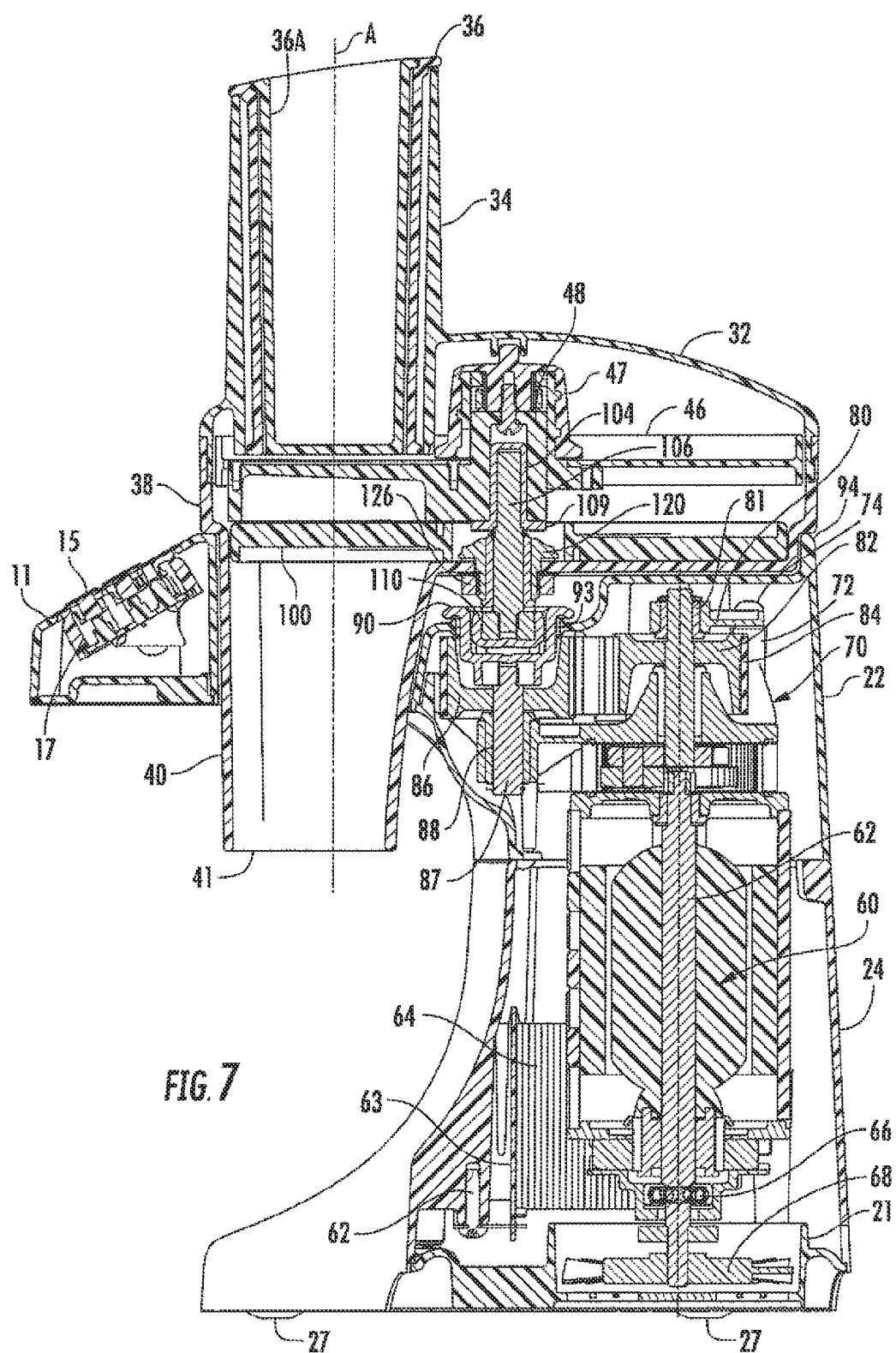
FIG. 7 is a vertical cross-sectional view of the food processor, taken along section lines VII-VII of FIG. 2.

As seen in FIGS. 5 and 7, a drive motor 60 with a rotary drive shaft 62 is secured to the upper housing 22 by fasteners that extend upwardly through multiple mounting holes 70A in motor mounting bracket 70. The drive shaft 62 of motor 60 extends through a lower bearing 66 (FIG. 7) and to a fan 68 mounted in the vented cylindrical housing 21 to provide cooling through openings in the floor of base plate 26 upwardly and around the motor and motor 60 and heat sink 64. The motor mounting bracket 70 is secured to the upper end of motor 60, as best seen in FIGS. 5 and 7. Bracket 70 is conventionally secured to the housing of motor 60 by fasteners (not shown) and to mounting flanges (not shown) within housing 24 to secure the motor in place. Bracket 70 includes mounting bosses 72 for receiving fasteners 74 (FIG. 7) for securing a drive plate 80 to the mounting bracket 70. The drive plate 80 serves to provide mounting for bushing 81. An offset drive for the lower drive coupling 90 for the food processing implement is now described.

Motor drive shaft 62 is secured to a first drive gear 82, and the same shaft is rotatably mounted to a bushing 81 (FIG. 7) in drive plate 80. Gear 82 has teeth coupled to teeth of a drive belt 84, in turn, coupled to a second drive gear 86. Gear 86 is threadably coupled to the lower drive coupling 90 extending through opening 91 in upper housing 22 and a surrounding cylindrical clearance opening 93, as best seen in FIG. 7. Gear 86 is mounted to drive shaft 87, which is supported at its lower end by a bushing 88 in mounting bracket 70. Thus, rotation of motor drive shaft 62 rotates the lower coupling 90 of the housing 20 which drives, as described below, a food processing implement, such as a cutter disk 46, of feed chute assembly 30.

The upper housing 22 likewise has a pair of spaced-apart curved edges 56 corresponding to the curvature of wall 55 of lower housing 24 and joining walls 51 of the base plate 26 to provide a generally concave curvilinear front surface for the food processor 10. The upper housing 22 includes a recess 92 surrounded by a rim 94 for receiving the feed chute assembly 30. Upper housing 22 also includes a generally oval-shaped aperture 96 for receiving the discharge chute 40 of the feed chute assembly 30 when positioned on housing 20, as seen in FIGS. 1-4 and 7.

The upper housing 22 includes a forward upper projection 11 for receiving a touch switch control pad 15 associated with the electronic control 17 for controlling the operation of the drive motor 60 from off to low and high speeds or pulsed operation. The electrical circuit 17 is enclosed by a bezel 18 having an aperture 19 aligned with aperture 96 for the food discharge chute 40. Bezel 18 has a curvature conforming to the curved edges 56 of the upper housing and is mounted thereto in a conventional manner.

The feed chute assembly 30 (FIGS. 6 and 7) includes a lid 32 having a food feed chute 34 and a removable food pusher 36. A telescoping secondary food pusher 36A extends into the central area of food pusher 36. Lid 32 is removably locked to a generally cylindrical base 38 with a bayonet-type mount including L-shaped slots 37 in base 38 and mating tabs 35 in lid 32. The base 38 includes a downwardly projecting food discharge chute 40, having an open mouth 42 within base 38 for receiving processed food. Chute 40 extends through aperture 96 in the upper housing 22 and aperture 19 in bezel 18 and has a lower output end 41, as seen in FIGS. 3 and 7, which positions the lower or exit end of food discharge chute 40 immediately above an awaiting container, such as 53 shown in FIG. 3, for food which is processed linearly along an axis identified by arrow A in FIG. 3 and axis A in FIG. 7, such that food entering the feed chute 34 is processed and directly flows along the axis A in a linear direction to the output 41 of food discharge chute 40. Between the base 38 and lid 32 of feed chute assembly 30 are food processing implements, such as a rotating cutter disk 46, which includes a cutter knife 43 adjacent an inclined ramp 44, with a blade depth adjustment knob 47 which may be of the type disclosed in U.S. Publication No. 2011/0265666, published Nov. 3, 2011, and entitled ADJUSTABLE FOOD PROCESSOR WITH GUIDE RAMP, the disclosure of which is incorporated herein by reference.

In addition to the cutting disk 46, the processor may include a cubing and dicing grid 100 which has a central aperture 102 extending over a drive bushing 104 which is keyed to the drive shaft 106 as described below. The cubing and dicing grid 100 includes a cubing side 101 with larger opening grates and a dicing side 105 with smaller grates to cube or dice food being sliced by the cutting disk 46. The cubing/dicing grid 100 is keyed to the base 38 by slots 107A in the outer diameter of grid 100 which align and engage inwardly extending ribs 39 on the inner diameter of base 38 so that the cubing grid is indexed in the cubing or dicing position under cutting disk 46. Apertures 107 are provided as fingerholes to aid in insertion and removal of grid 100 from base 38.

Figure 6:
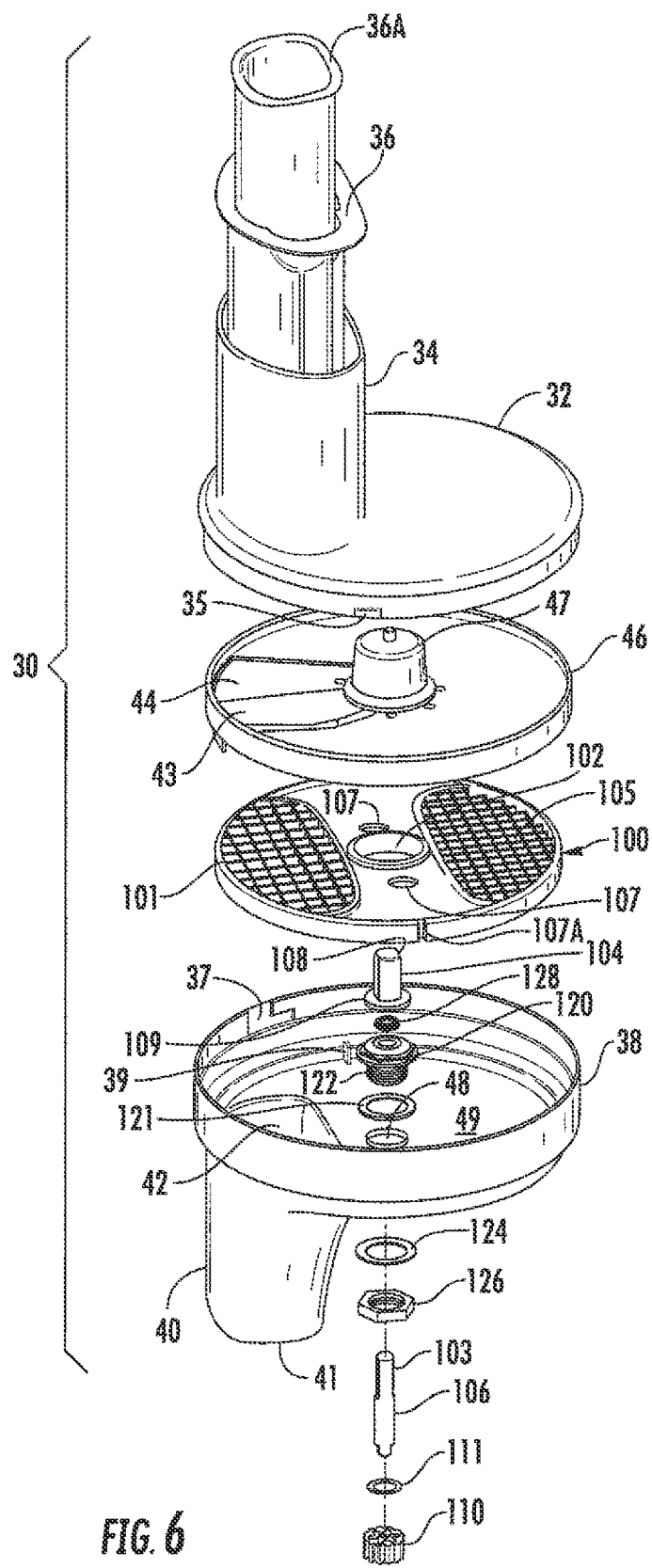
FIG. 6 is an exploded perspective view of the feed chute assembly for the food processor shown in FIGS. 1-4.

The rotary motion from the lower coupling 90 of the housing 20 is applied to the drive shaft 106 through a mating upper coupling 110, which is fixedly coupled by threads to the lower end of shaft 106. A Teflon® washer 111 is interposed between coupling 110 and a threaded nut 126 secured to a feed-through bushing 120. Bushing 120 extends through an aperture 48 in base 38 and is sealed by means of a rubber seal 121 to the floor 49 of base 38. The threaded lower end 122 of bushing 120 extends through aperture 48 and through a stainless steel flat washer 124 and is secured to the base 38 by a threaded nut 126. The upper end of drive shaft 106 extends through the bushing 120 through a rubber seal 128 and into a drive bushing 104 having a flat 108 thereon for keying to the drive hub 48 of cutting disk 46. The drive hub 48 includes a keyed slot for receiving the bushing 104, as best seen in FIGS. 6 and 7. The drive bushing can be locked to the flat 103 on the upper end of drive shaft 106 by means of a suitable set screw.

The lower end of drive bushing 104 includes an annular flange 109 to affect the seal between the rotary shaft 106, the stationary bushing 120, the rotary drive bushing 104, and rubber seal 128.

Figure 8:
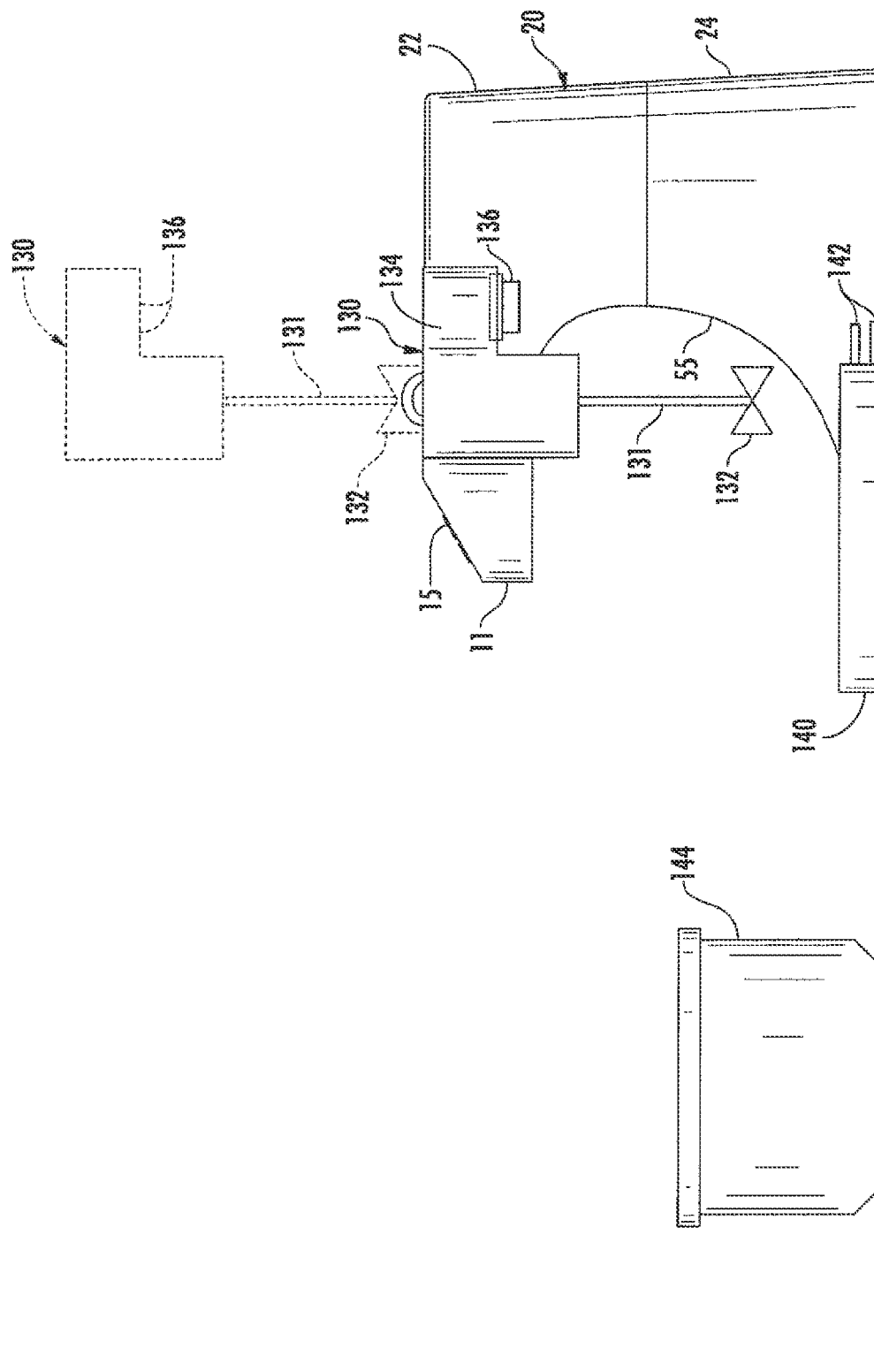
FIG. 8 is a side elevational view of alternative accessories which can be associated with the housing of the food processor.

The food processor of this application can also be employed with a variety of food processing implements, such as slicing disks, shredding disks, dough blades, multipurpose blades, and the like. In addition, it is particularly well adapted for other implements which can employ conventional bowls positioned in the area between the legs 50 and 52 of the housing in the concave area 51. FIG. 8 illustrates one appliance, such as a stirring unit 130 having a stirring rod 131 coupled to a stirring implement 132 and driven by a right-angle power beater head 134 having a coupler 136 which mates with the lower coupling 90. Thus, the stir unit 130 can be lowered onto the base to the housing 20 and controlled with the same control panel 15 as employed with the food processor described earlier. Additionally, the open area between legs 50 and 52 can accommodate a resistance-type heater or a Peltier-type hot or cold plate 140 coupled by a power supply through contacts 142 which may optionally be included in the lower housing 24 for either heating or cooling items being stirred by stirring implement 132. For example, an ice cream bowl 144 for mixing ice cream may be placed on plate 140 in the cold mode of operation and the stirring unit 130 lowered onto the housing 20 and actuated for making ice cream, as only an example of the universal applicability of the linear feature of the processor 10.

It will be understood by one having ordinary skill in the art that construction of the described food processor and other components is not limited to any specific material. Other exemplary embodiments disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present application. The exemplary structures and processes disclosed herein are for illustrative purposes and are not to be construed as limiting.

It is also to be understood that variations and modifications can be made on the aforementioned structures and methods without departing from the concepts of the present application, and further it is to be understood that such concepts are intended to be covered by the following claims unless these claims by their language expressly state otherwise.

The above description is considered that of the illustrated embodiments only. Modifications will occur to those skilled in the art and to those who make or use the food processor. Therefore, it is understood that the embodiments shown in the drawings and described above is merely for illustrative purposes and not intended to limit the scope of the application, which is defined by the following claims as interpreted according to the principles of patent law, including the Doctrine of Equivalents.

What is claimed:

1. A food processor comprising:
   a housing including a recess for receiving a feed chute assembly, wherein said housing has an open front for receiving containers for food processed by said food processor;
   the feed chute assembly including a food receiving chute communicating with a food processing implement engaging said coupling of said housing, said feed chute assembly including a food discharge chute axially aligned with the food receiving chute along a first axis such that food is processed linearly from said food receiving chute to said food discharge chute;
   a motor in the housing for rotating about a second axis that is parallel to and radially offset from the first axis; and
   the food processing implement rotated by the motor about a third axis parallel to and radially offset from the first and second axes, the food processing implement rotating in a plane perpendicular to the first axis.

2. The food processor as defined in claim 1 wherein said housing includes an aperture in said recess for receiving said food discharge chute.

3. The food processor as defined in claim 2 wherein said food discharge chute of said feed chute assembly extends through said aperture in said housing to direct processed food into the area of the open front of said housing.

4. The food processor as defined in claim 3 wherein said housing includes a pair of spaced-apart legs defining said open front.

5. The food processor as defined in claim 4 wherein said housing includes a concave wall extending between said legs for allowing a container to be positioned below and in alignment with said food discharge chute.

6. The food processor as defined in claim 5 wherein said feed chute assembly is removable from said housing.

7. The food processor as defined in claim 6 wherein said feed chute assembly includes a base including said food discharge chute and a removable lid including said food receiving chute.

8. The food processor as defined in claim 7 wherein said feed chute assembly of said food processor includes a rotary drive shaft and an upper coupling which engages said coupling of said housing when said feed chute assembly is positioned in said recess of said housing.

9. The food processor as define in claim 8 wherein said drive shaft includes an end to which at least one food processing implement is removably attached.

10. The food processor as defined in claim 9 where said at least one food processing implement includes a cutting knife mounted to a disk and positioned to discharge cut food items into said food discharge chute.

11. The food processor as defined in claim 1 wherein said housing includes upper and lower housing sections and said lower housing includes a pair of spaced-apart divergent legs for receiving a container therebetween.

12. The food processor as defined in claim 11 wherein said legs define a concave curve between them for receiving curved containers for receiving food processed by said food processor.

13. The food processor as defined in claim 12 wherein said upper housing includes a forwardly extending lip adjacent said discharge chute and a switch control panel positioned in said lip.

14. The food processor as defined in claim 13 wherein said food processing implement includes one of a blade, a slicing grid, a dicing grid, a dough blade, a multipurpose blade, and a stirring paddle.

15. The food processor as defined in claim 1 wherein said housing has a curved rear surface.

\* \* \* \* \*